US012363481B2

(12) United States Patent
Pan

(10) Patent No.: US 12,363,481 B2
(45) Date of Patent: Jul. 15, 2025

(54) AUDIO PROCESSING METHOD AND APPARATUS, WIRELESS EARPHONE, AND STORAGE MEDIUM

(71) Applicant: WAVARTS TECHNOLOGIES CO., LTD., Beijing (CN)

(72) Inventor: Xingde Pan, Beijing (CN)

(73) Assignee: WAVARTS TECHNOLOGIES CO., LTD., Beijing (CN)

( * ) Notice: Subject to any disclaimer, the term of this patent is extended or adjusted under 35 U.S.C. 154(b) by 268 days.

(21) Appl. No.: 18/157,227

(22) Filed: Jan. 20, 2023

(65) Prior Publication Data

US 2023/0156404 A1 May 18, 2023

Related U.S. Application Data

(63) Continuation of application No. PCT/CN2021/081461, filed on Mar. 18, 2021.

(30) Foreign Application Priority Data

Jul. 31, 2020 (CN) ........................ 202010762073.X

(51) Int. Cl.
*H04R 5/00* (2006.01)
*H04R 5/033* (2006.01)
*H04R 5/04* (2006.01)

(52) U.S. Cl.
CPC ............... *H04R 5/04* (2013.01); *H04R 5/033* (2013.01); *H04R 2420/07* (2013.01)

(58) Field of Classification Search
CPC .................................. H04R 5/04; H04R 5/033
See application file for complete search history.

(56) References Cited

U.S. PATENT DOCUMENTS

2018/0073886 A1 3/2018 Ilse et al.
2020/0196058 A1 6/2020 Udesen

FOREIGN PATENT DOCUMENTS

CN 106664499 A 5/2017
CN 109040946 A 12/2018
(Continued)

OTHER PUBLICATIONS

Supplementary European Search Report of corresponding European Application No. 21851021.2, dated Nov. 24, 2023, 8 pages.
(Continued)

*Primary Examiner* — Rasha S Al Aubaidi
(74) *Attorney, Agent, or Firm* — Tucker Ellis LLP

(57) ABSTRACT

The present application provides an audio processing method and apparatus, a wireless earphone, and a storage medium. A first wireless earphone receives a first to-be-presented audio signal sent by a playing device, and a second wireless earphone receives a second to-be-presented audio signal sent by the playing device; then, the first wireless earphone performs rendering processing on the first to-be-presented audio signal to obtain a first audio playing signal, and the second wireless earphone performs rendering processing on the second to-be-presented audio signal to obtain a second audio playing signal; and finally the first wireless earphone plays the first audio playing signal, and the second wireless earphone plays the second audio playing signal. Therefore, it is possible to achieve technical effects of greatly reducing the delay and improving the sound quality of the earphone since the wireless earphone can render the audio signals independently of the playing device.

11 Claims, 8 Drawing Sheets

(56) References Cited

FOREIGN PATENT DOCUMENTS

| | | | |
|---|---|---|---|
| CN | 109644314 | A | 4/2019 |
| CN | 109792582 | A | 5/2019 |
| CN | 110825338 | A | 2/2020 |
| CN | 111194561 | A | 5/2020 |
| CN | 111918176 | A | 11/2020 |
| EP | 3687193 | A1 | 7/2020 |
| JP | 3225334 | U | 2/2020 |
| WO | 2020/043539 | A1 | 3/2020 |

OTHER PUBLICATIONS

International Search Report of corresponding International Application No. PCT/CN2021/081461, dated Jun. 11, 2021, 13 pages.

First Office Action of corresponding Chinese Application No. 202010762073.X, dated May 9, 2024, 16 pages.

AUDIO PROCESSING METHOD AND APPARATUS, WIRELESS EARPHONE, AND STORAGE MEDIUM

CROSS-REFERENCE TO RELATED APPLICATIONS

This application is a continuation of International Application No. PCT/CN2021/081461, filed on Mar. 18, 2021, which claims priority to Chinese Patent Application No. 202010762073.X, filed on Jul. 31, 2020. The disclosures of the aforementioned applications are hereby incorporated by reference in their entireties.

TECHNICAL FIELD

The present application relates to the field of electronic technologies, and in particular, to an audio processing method and apparatus, a wireless earphone, and a storage medium.

BACKGROUND

With the development of intelligent mobile equipment, earphones become a necessary product for people to listen to sound daily. Wireless earphones, due to their convenience, are increasingly popular in the market, and even gradually become mainstream earphone products. Accordingly, people have increasingly demanded higher sound quality, and have been pursuing lossless sound quality, gradually improved spatial and immersion sound, and now is further pursuing 360° surround sound and true full-scale immersion three-dimensional panoramic sound since from the original mono sound and stereo sound.

At present, in existing wireless earphones, such as a traditional wireless Bluetooth earphone and a true wireless TWS earphone, since the wireless earphone side transmits head motion information to the playing device side for processing, compared with the high standard requirements for high-quality surround sound or three-dimensional panoramic sound effects with all-round immersion, this method has a large data transmission delay, leading to rendering imbalance between two earphones, or has poor real-time rendering effects, resulting in that the rendering sound effect cannot meet ideal high-quality requirements.

Therefore, the existing wireless earphone has the technical problem that the data interaction with the playing terminal cannot meet the requirement of high-quality sound effect.

SUMMARY

The present application provides an audio processing method and apparatus, a wireless earphone, and a storage medium, to solve the technical problem that data interaction between the existing wireless earphone and the playing device cannot meet the requirement of high-quality sound effect.

In a first aspect, the present application provides an audio processing method applied to a wireless earphone including a first wireless earphone and a second wireless earphone, where the first wireless earphone and the second wireless earphone are used to establish a wireless connection with a playing device, and the method includes:

receiving, by the first wireless earphone, a first to-be-presented audio signal sent by the playing device, and receiving, by the second wireless earphone, a second to-be-presented audio signal sent by the playing device;

performing, by the first wireless earphone, rendering processing on the first to-be-presented audio signal to obtain a first audio playing signal, and performing, by the second wireless earphone, rendering processing on the second to-be-presented audio signal to obtain a second audio playing signal; and playing, by the first wireless earphone, the first audio playing signal, and playing, by the second wireless earphone, the second audio playing signal.

In one possible design, if the first wireless earphone is a left-ear wireless earphone and the second wireless earphone is a right-ear wireless earphone, the first audio playing signal is used to present a left-ear audio effect and the second audio playing signal is used to present a right-ear audio effect to form a binaural sound field when the first wireless earphone plays the first audio playing signal and the second wireless earphone plays the second audio playing signal.

In one possible design, before the first wireless earphone performs the rendering processing on the first to-be-presented audio signal, the audio processing method further includes:

performing, by the first wireless earphone, decoding processing on the first to-be-presented audio signal, to obtain a first decoded audio signal, correspondingly, performing, by the first wireless earphone, the rendering processing on the first to-be-presented audio signal includes:

performing, by the first wireless earphone, the rendering processing according to the first decoded audio signal and rendering metadata, to obtain the first audio playing signal; and before the second wireless earphone performs the rendering processing on the second to-be-presented audio signal, the audio processing method further includes:

performing, by the second wireless earphone, decoding processing on the second to-be-presented audio signal, to obtain a second decoded audio signal, correspondingly, performing, by the second wireless earphone, the rendering processing on the second to-be-presented audio signal includes:

performing, by the second wireless earphone, the rendering processing according to the second decoded audio signal and rendering metadata, to obtain the second audio playing signal.

In one possible design, the rendering metadata includes at least one of first wireless earphone metadata, second wireless earphone metadata and playing device metadata.

In one possible design, the first wireless earphone metadata includes first earphone sensor metadata and a head related transfer function HRTF database, where the first earphone sensor metadata is used to characterize a motion characteristic of the first wireless earphone, the second wireless earphone metadata includes second earphone sensor metadata and a head related transfer function HRTF database, where the second earphone sensor metadata is used to characterize a motion characteristic of the second wireless earphone, and the playing device metadata includes playing device sensor metadata, where the playing device sensor metadata is used to characterize a motion characteristic of the playing device.

In one possible design, before the rendering processing is performed, the audio processing method further includes:

synchronizing, by the first wireless earphone, the rendering metadata with the second wireless earphone.

In one possible design, if the first wireless earphone is provided with an earphone sensor, the second wireless earphone is not provided with an earphone sensor, and the playing device is not provided with a playing device sensor, synchronizing, by the first wireless earphone, the rendering metadata with the second wireless earphone includes:

sending, by the first wireless earphone, the first earphone sensor metadata to the second wireless earphone, so that the second wireless earphone uses the first earphone sensor metadata as the second earphone sensor metadata.

In one possible design, if each of the first wireless earphone and the second wireless earphone is provided with an earphone sensor and the playing device is not provided with a playing device sensor, synchronizing, by the first wireless earphone, the rendering metadata with the second wireless earphone includes:

sending, by the first wireless earphone, the first earphone sensor metadata to the second wireless earphone, and sending, by the second wireless earphone, the second earphone sensor metadata to the first wireless earphone; and determining, by the first wireless earphone and the second wireless earphone respectively, the rendering metadata according to the first earphone sensor metadata, the second earphone sensor metadata and a preset numerical algorithm, or sending, by the first wireless earphone, the first earphone sensor metadata to the playing device and sending, by the second wireless earphone, the second earphone sensor metadata to the playing device, so that the playing device determines the rendering metadata according to the first earphone sensor metadata, the second earphone sensor metadata and a preset numerical algorithm; and receiving, by the first wireless earphone and the second wireless earphone respectively, the rendering metadata.

In one possible design, if the first wireless earphone is provided with an earphone sensor, the second wireless earphone is not provided with an earphone sensor and the playing device is provided with a playing device sensor, synchronizing, by the first wireless earphone, the rendering metadata with the second wireless earphone includes:

sending, by the first wireless earphone, the first earphone sensor metadata to the playing device, so that the playing device determines the rendering metadata according to the first earphone sensor metadata, the playing device sensor metadata and a preset numerical algorithm; and receiving, by the first wireless earphone and the second wireless earphone respectively, the rendering metadata; or receiving, by the first wireless earphone, playing device sensor metadata sent by the playing device;

determining, by the first wireless earphone, the rendering metadata according to the first earphone sensor metadata, the playing device sensor metadata and a preset numerical algorithm; and sending, by the first wireless earphone, the rendering metadata to the second wireless earphone.

In one possible design, if each of the first wireless earphone and the second wireless earphone is provided with an earphone sensor and the playing device is provided with a playing device sensor, synchronizing, by the first wireless earphone, the rendering metadata with the second wireless earphone includes:

sending, by the first wireless earphone, the first earphone sensor metadata to the playing device, and sending, by the second wireless earphone, the second earphone sensor metadata to the playing device, so that the playing device determines the rendering metadata according to the first earphone sensor metadata, the second earphone sensor metadata, the playing device sensor metadata and a preset numerical algorithm; and receiving, by the first wireless earphone and the second wireless earphone respectively, the rendering metadata, or sending, by the first wireless earphone, the first earphone sensor metadata to the second wireless earphone, and sending, by the second wireless earphone, the second earphone sensor metadata to the first wireless earphone;

receiving, by the first wireless earphone and the second wireless earphone respectively, the playing device sensor metadata; and determining, by the first wireless earphone and the second wireless earphone respectively, the rendering metadata according to the first earphone sensor metadata, the second earphone sensor metadata, the playing device sensor metadata and a preset numerical algorithm.

In an embodiment, the earphone sensor includes at least one of a gyroscope sensor, a head-size sensor, a ranging sensor, a geomagnetic sensor and an acceleration sensor, and/or the playing device sensor includes at least one of a gyroscope sensor, a head-size sensor, a ranging sensor, a geomagnetic sensor and an acceleration sensor.

In an embodiment, the first to-be-presented audio signal includes at least one of a channel-based audio signal, an object-based audio signal, a scene-based audio signal, and/or the second to-be-presented audio signal includes at least one of a channel-based audio signal, an object-based audio signal, a scene-based audio signal.

In an embodiment, the wireless connection includes: a Bluetooth connection, an infrared connection, a WIFI connection, and a LIFI visible light connection.

In a second aspect, the present application provides an audio processing apparatus, including:

a first audio processing apparatus and a second audio processing apparatus;

where the first audio processing apparatus includes:

a first receiving module, configured to receive a first to-be-presented audio signal sent by a playing device;

a first rendering module, configured to perform rendering processing on the first to-be-presented audio signal to obtain a first audio playing signal; and a first playing module, configured to play the first audio playing signal, and the second audio processing apparatus includes:

a second receiving module, configured to receive a second to-be-presented audio signal sent by the playing device;

a second rendering module, configured to perform rendering processing on the second to-be-presented audio signal to obtain a second audio playing signal; and a second playing module, configured to play the second audio playing signal.

In one possible design, the first audio processing apparatus is a left-ear audio processing apparatus and the second audio processing apparatus is a right-ear audio processing apparatus, the first audio playing signal is used to present a left-ear audio effect and the second audio playing signal is used to present a right-ear audio effect, to form a binaural sound field when the first audio processing apparatus plays the first audio playing signal and the second audio processing apparatus plays the second audio playing signal.

In one possible design, the first audio processing apparatus further includes:

a first decoding module, configured to perform decoding processing on the first to-be-presented audio signal, to obtain a first decoded audio signal; and the first rendering module is specifically configured to: perform rendering processing according to the first decoded audio signal and rendering metadata, to obtain the first audio playing signal, and the second audio processing apparatus further includes:

a second decoding module, configured to perform decoding processing on the second to-be-presented audio signal, to obtain a second decoded audio signal; and the second rendering module is specifically configured to: perform rendering processing according to the second decoded audio signal and rendering metadata, to obtain the second audio playing signal.

In one possible design, the rendering metadata includes at least one of first wireless earphone metadata, second wireless earphone metadata and playing device metadata.

In one possible design, the first wireless earphone metadata includes first earphone sensor metadata and a head related transfer function HRTF database, where the first earphone sensor metadata is used to characterize a motion characteristic of the first wireless earphone;

the second wireless earphone metadata includes second earphone sensor metadata and a head related transfer function HRTF database, where the second earphone sensor metadata is used to characterize a motion characteristic of the second wireless earphone, and the playing device metadata includes playing device sensor metadata, where the playing device sensor metadata is used to characterize a motion characteristic of the playing device.

In one possible design, the first audio processing apparatus further includes:

a first synchronizing module, configured to synchronize the rendering metadata with the second wireless earphone, and/or the second audio processing apparatus further includes:

a second synchronizing module, configured to synchronize the rendering metadata with the first wireless earphone.

In one possible design, the first synchronizing module is specifically configured to: send the first earphone sensor metadata to the second wireless earphone, so that the second synchronizing module uses the first earphone sensor metadata as the second earphone sensor metadata.

In one possible design, the first synchronizing module is specifically configured to:

send the first earphone sensor metadata;

receive the second earphone sensor metadata; and determine the rendering metadata according to the first earphone sensor metadata, the second earphone sensor metadata and a preset numerical algorithm, and the second synchronizing module is specifically configured to:

send the second earphone sensor metadata;

receive the first earphone sensor metadata; and determine the rendering metadata according to the first earphone sensor metadata, the second earphone sensor metadata and a preset numerical algorithm, or the first synchronizing module is specifically configured to:

send the first earphone sensor metadata; and receive the rendering metadata, and the second synchronizing module is specifically configured to:

send the second earphone sensor metadata; and receive the rendering metadata.

In one possible design, the first synchronizing module is specifically configured to:

receive playing device sensor metadata;

determine the rendering metadata according to the first earphone sensor metadata, the playing device sensor metadata and a preset numerical algorithm; and send the rendering metadata.

In one possible design, the first synchronizing module is specifically configured to:

send the first earphone sensor metadata;

receive the second earphone sensor metadata;

receive the playing device sensor metadata; and determine the rendering metadata according to the first earphone sensor metadata, the second earphone sensor metadata, the playing device sensor metadata and a preset numerical algorithm, and the second synchronizing module is specifically configured to:

send the second earphone sensor metadata;

receive the first earphone sensor metadata;

receive the playing device sensor metadata; and determine the rendering metadata according to the first earphone sensor metadata, the second earphone sensor metadata, the playing device sensor metadata and a preset numerical algorithm.

In an embodiment, the first to-be-presented audio signal includes at least one of a channel-based audio signal, an object-based audio signal, and a scene-based audio signal, and/or the second to-be-presented audio signal includes at least one of a channel-based audio signal, an object-based audio signal, and a scene-based audio signal.

In a third aspect, the present application provides a wireless earphone, including:

a first wireless earphone and a second wireless earphone;

the first wireless earphone includes:

a first processor; and a first memory, configured to store a computer program of the first processor, where the first processor is configured to implement the steps of the first wireless earphone of any possible audio processing method in the first aspect by executing the computer program, and the second wireless earphone includes:

a second processor; and a second memory, configured to store a computer program of the second processor, where the second processor is configured to implement the steps of the second wireless earphone of any possible audio processing method in the first aspect by executing the computer program.

In a fourth aspect, the present application further provides a storage medium on which a computer program is stored, where the computer program is configured to implement any possible audio processing method provided in the first aspect.

The present application provides an audio processing method and apparatus, a wireless earphone, and a storage medium. A first wireless earphone receives a first to-be-presented audio signal sent by a playing device, and a second wireless earphone receives a second to-be-presented audio signal sent by the playing device. Then, the first wireless earphone performs rendering processing on the first to-be-presented audio signal to obtain a first audio playing signal, and the second wireless earphone performs rendering processing on the second to-be-presented audio signal to obtain a second audio playing signal. Finally, the first wireless earphone plays the first audio playing signal, and the second wireless earphone plays the second audio playing signal. Therefore, it is possible to achieve technical effects of greatly reducing the delay and improving the sound quality of the earphone since the wireless earphone can render the audio signals independently of the playing device.

BRIEF DESCRIPTION OF DRAWINGS

In order to explain the embodiments of the present application or the technical solutions in the prior art more clearly, the following will briefly introduce the drawings that need to be used in the description of the embodiments or the prior art. Obviously, the drawings in the following description are intended for some embodiments of the present application, and for those skilled in the art, other drawings can be obtained according to these drawings without creative efforts.

Figure 1:
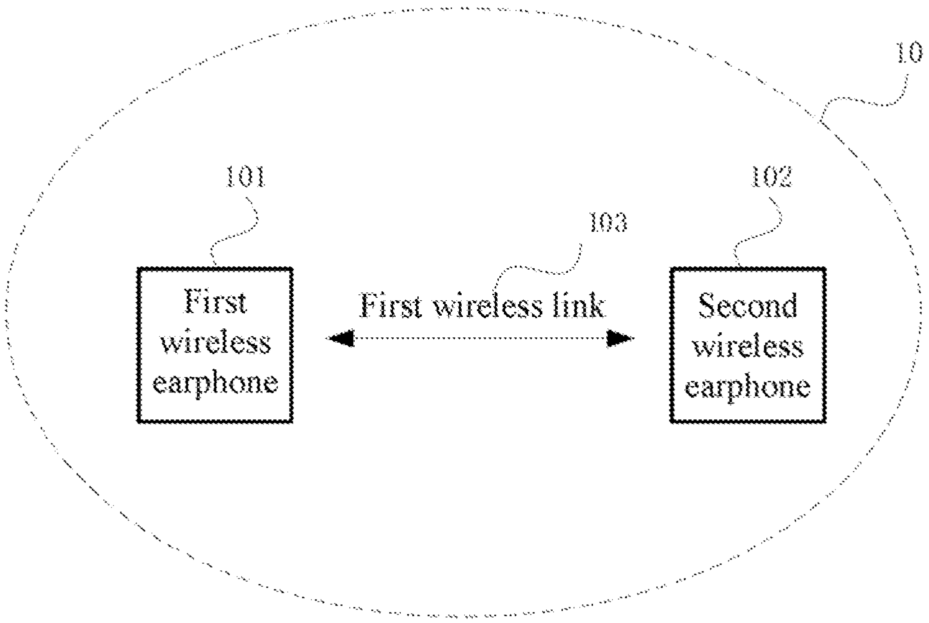
FIG. 1 is a schematic structural diagram of a wireless earphone according to an exemplary embodiment of the present application.

Through the above drawings, specific embodiments of the present application have been shown, and will be described in more detail later. These figures and descriptions are not intended to limit the scope of the concept of the present application in any way, but to explain the concept of the present application for those skilled in the art with reference to the specific embodiments.

DETAILED DESCRIPTION OF EMBODIMENTS

In order to make the objects, technical solutions and advantages of the embodiments of the present application clearer, the technical solutions in the embodiments of the present application will be clearly and completely described below with reference to the drawings in the embodiments of the present application, and it is obvious that the described embodiments are some, but not all, embodiments of the present application. All other embodiments, including but not limited to a combination of multiple embodiments, which can be derived by a person ordinarily skilled in the art from the embodiments given herein without making any creative effort, shall fall within the protection scope of the present application.

The terms "first," "second," "third," "fourth," and the like (if any) in the description and in the claims, as well as in the drawings of the present application, are used for distinguishing between similar elements and not necessarily for describing a particular sequential or chronological order. It is to be understood that the data so used is interchangeable under appropriate circumstances such that the embodiments of the present application described herein are, for example, capable of operation in sequences other than those illustrated or otherwise described herein. Furthermore, the terms "include" and "have" and any variations thereof, are intended to cover a non-exclusive inclusion, for example, processes, methods, systems, articles, or devices that include a list of steps or elements are not necessarily limited to those steps or elements expressly listed, but may include other steps or elements not expressly listed or inherent to such processes, methods, articles, or devices.

The following uses specific embodiments to describe the technical solutions of the present application and how to solve the above technical problems with the technical solutions of the present application. The following several specific embodiments may be combined with each other, and details of the same or similar concepts or processes may not be repeated in some embodiments. Embodiments of the present application will be described below with reference to the accompanying drawings.

Figure 2:
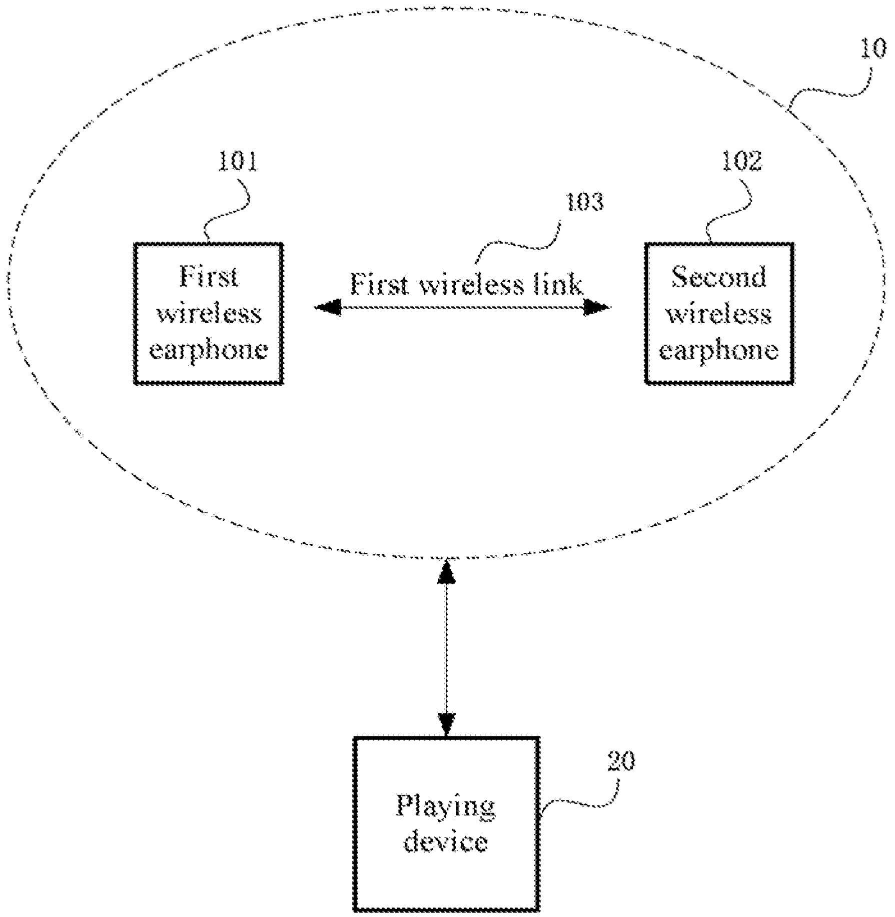
FIG. 2 is a schematic diagram illustrating an application scenario of an audio processing method according to an exemplary embodiment of the present application.

FIG. 1 is a schematic structural diagram of a wireless earphone according to an exemplary embodiment of the present application, and FIG. 2 is a schematic diagram illustrating an application scenario of an audio processing method according to an exemplary embodiment of the present application. As shown in FIG. 1-FIG. 2, a communication method for a set of wireless transceiving devices provided in the present embodiment is applied to a wireless earphone 10, where the wireless earphone 10 includes a first wireless earphone 101 and a second wireless earphone 102, and the wireless transceiving devices in the wireless earphone 10 are communicatively connected through a first wireless link 103. It is worth to be noted that the communication connection between the wireless earphone 101 and the wireless earphone 102 in the wireless earphone 10 may be bidirectional or unidirectional, which is not specifically limited in the present embodiment. Furthermore, it is understood that, for the wireless earphone 10 and the playing device 20 described above, they may be wireless transceiving devices which communicate according to a standard wireless protocol, where the standard wireless protocol may be a Bluetooth protocol, a WIFI protocol, a LIFT protocol, an infrared wireless transmission protocol, etc., and in the present embodiment, the specific form of the wireless protocol is not limited. In order to specifically describe an application scenario of the wireless connection method provided in the present embodiment, description may be made by taking an example where the standard wireless protocol is a Bluetooth protocol, here, the wireless earphone 10 may be a TWS (True Wireless Stereo) true wireless earphone, or a conventional Bluetooth earphone, or the like.

Figure 3:
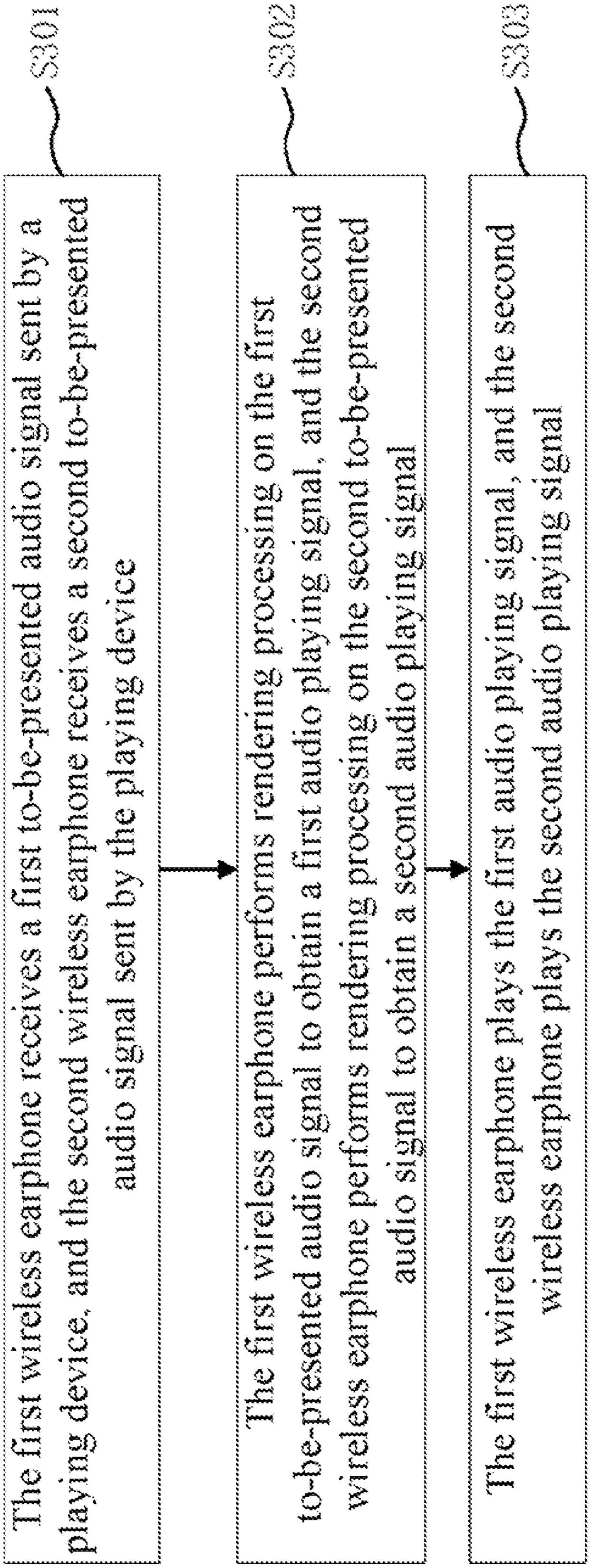
FIG. 3 is a schematic flowchart of an audio processing method according to an exemplary embodiment of the present application.

FIG. 3 is a schematic flowchart of an audio processing method according to an exemplary embodiment of the present application. As shown in FIG. 3, the audio processing method provided in the present embodiment is applied to a wireless earphone, the wireless earphone includes a first wireless earphone and a second wireless earphone, and the method includes:

S301, the first wireless earphone receives a first to-be-presented audio signal sent by a playing device, and the second wireless earphone receives a second to-be-presented audio signal sent by the playing device.

In this step, the playing device sends the first to-be-presented audio signal and the second to-be-presented audio signal to the first wireless earphone and the second wireless earphone respectively.

It is understood that, in the present embodiment, the wireless connection includes: a Bluetooth connection, an infrared connection, a WIFI connection, and a LIFT visible light connection.

In an embodiment, if the first wireless earphone is a left-ear wireless earphone and the second wireless earphone is a right-ear wireless earphone, the first audio playing signal is used to present a left-ear audio effect and the second audio playing signal is used to present a right-ear audio effect to form a binaural sound field when the first wireless earphone plays the first audio playing signal and the second wireless earphone plays the second audio playing signal.

It should be noted that the first to-be-presented audio signal and the second to-be-presented audio signal are obtained by distributing the original audio signal according to a preset distribution model, and the two obtained audio signals can form a complete binaural sound field in terms of audio signal characteristics, or can form stereo surround sound or three-dimensional stereo panoramic sound.

The first to-be-presented audio signal or the second to-be-presented audio signal contains scene information such as the number of microphones for collecting the HOA/FOA signal, the order of the HOA, the type of the HOA virtual sound field, etc. It should be noted that, when the first to-be-presented audio signal or the second to-be-presented audio signal is a channel-based or a "channel+object"-based audio signal, if the first to-be-presented audio signal or the second to-be-presented audio signal includes a control signal that does not require subsequent binaural processing, the corresponding channel is directly allocated to the left earphone or the right earphone, i.e., the first wireless earphone or the second wireless earphone, according to an instruction. It is further noted that the first to-be-presented audio signal or the second to-be-presented audio signal are both unprocessed signals, whereas the prior art is typically for processed signals; in addition, the first to-be-presented audio signal and the second to-be-presented audio signal may be the same or different.

When the first to-be-presented audio signal or the second to-be-presented audio signal is an audio signal of another type, such as "stereo+object", it is necessary to simultaneously transmit the first to-be-presented audio signal and the second to-be-presented audio signal to the first wireless earphone and the second wireless earphone. If the stereo binaural signal control instruction indicates that the binaural signal does not need further binaural processing, a left channel compressed audio signal, i.e., the first to-be-presented audio signal, is transmitted to a left earphone terminal, i.e., the first wireless earphone, and a right channel compressed audio signal, i.e., the second to-be-presented audio signal, is transmitted to a right earphone terminal, i.e., the second wireless earphone, respectively; the object information still needs to be transmitted to processing units of the left and right earphone terminals; and finally the play signal provided to the first wireless earphone and the second wireless earphone is a mixture of the object rendered signal and the corresponding channel signal.

It is noted that, in one possible design, the first to-be-presented audio signal includes at least one of a channel-based audio signal, an object-based audio signal and a scene-based audio signal, and/or the second to-be-presented audio signal includes at least one of a channel-based audio signal, an object-based audio signal and a scene-based audio signal.

It is further noted that the first to-be-presented audio signal or the second to-be-presented audio signal includes metadata information determining how the audio is to be presented in a particular playback scenario, or information related to the metadata information.

In further, in an embodiment, the playing device may re-encode the rendered audio data and the rendered metadata, and output the encoded audio code stream as a to-be-presented audio signal to the wireless earphone through wireless transmission.

S302, the first wireless earphone performs rendering processing on the first to-be-presented audio signal to obtain a first audio playing signal, and the second wireless earphone performs rendering processing on the second to-be-presented audio signal to obtain a second audio playing signal.

In this step, the first wireless earphone and the second wireless earphone respectively perform rendering processing on the received first to-be-presented audio signal and the received second to-be-presented audio signal, so as to obtain the first audio playing signal and the second audio playing signal.

In an embodiment, before the first wireless earphone performs the rendering processing on the first to-be-presented audio signal, the audio processing method further includes:

performing, by the first wireless earphone, decoding processing on the first to-be-presented audio signal, to obtain a first decoded audio signal, correspondingly, performing, by the first wireless earphone, the rendering processing on the first to-be-presented audio signal includes:

performing, by the first wireless earphone, the rendering processing according to the first decoded audio signal and rendering metadata, to obtain the first audio playing signal, and before the second wireless earphone performs the rendering processing on the second to-be-presented audio signal, the audio processing method further includes:

performing, by the second wireless earphone, decoding processing on the second to-be-presented audio signal, to obtain a second decoded audio signal, correspondingly, performing, by the second wireless earphone, the rendering processing on the second to-be-presented audio signal includes:

performing, by the second wireless earphone, the rendering processing according to the second decoded audio signal and rendering metadata, to obtain the second audio playing signal.

It can be understood that, some signals to be presented, which are transmitted to the wireless earphone by the playing device side, can be rendered directly without decoding, and some compressed code streams can be rendered only after being decoded.

To specifically describe the rendering process, detailed description will be made hereunder with reference to FIG. 4.

Figure 4:
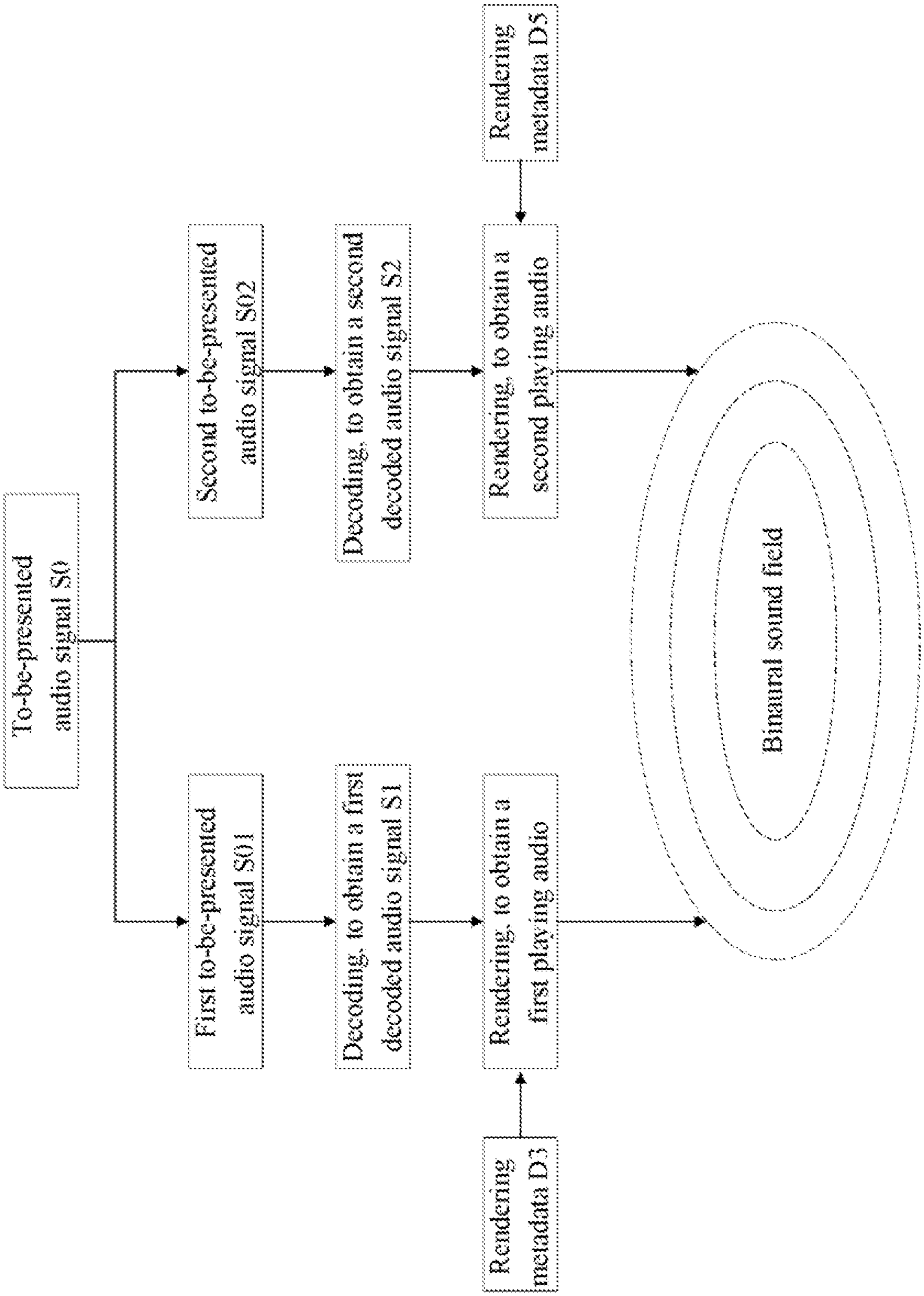
FIG. 4 is a schematic diagram of a data link for audio signal processing according to an embodiment of the present application.

FIG. 4 is a schematic diagram of a data link for audio signal processing according to an embodiment of the present application. As shown in FIG. 4, a to-be-presented audio signal S0 output by the playing device includes two parts, i.e., a first to-be-presented audio signal S01 and a second to-be-presented audio signal S02 which are respectively received by the first wireless earphone and the second wireless earphone and then are respectively decoded by the first wireless earphone and the second wireless earphone, to obtain a first decoded audio signal S1 and a second decoded audio signal S2.

It should be noted that the first to-be-presented audio signal S01 and the second to-be-presented audio signal S02 may be the same, or may be different, or may have partial contents overlapping, but the first to-be-presented audio signal S01 and the second to-be-presented audio signal S02 can be combined into the to-be-presented audio signal S0.

Specifically, the first to-be-presented audio signal or the second to-be-presented audio signal includes a channel-based audio signal, such as an AAC/AC3 code stream; an object-based audio signal, such as an ATMOS/MPEG-H code stream; a scene-based audio signal, such as an MPEG-H HOA code stream; or an audio signal of any combination of the above three audio signals, such as a WANOS code stream.

When the first to-be-presented audio signal or the second to-be-presented audio signal is the channel-based audio signal, such as the AAC/AC3 code stream, the audio code stream is fully decoded to obtain an audio content signal of each channel, as well as channel characteristic information such as a sound field type, a sampling rate, a bit rate, etc. The first to-be-presented audio signal or the second to-be-presented audio signal also includes control instructions with regard to whether binaural processing is required.

When the first to-be-presented audio signal or the second to-be-presented audio signal is the object-based audio signal, such as the ATMOS/MPEG-H code stream, the audio signal is decoded to obtain an audio content signal of each channel, as well as channel characteristic information, such as a sound field type, a sampling rate, a bit rate, etc., so as to obtain an audio content signal of the object, as well as metadata of the object, such as a size of the object, three-dimensional spatial information, etc.

When the first to-be-presented audio signal or the second to-be-presented audio signal is the scene-based audio signal, such as the MPEG-H HOA code stream, the audio code stream is fully decoded to obtain audio content signals of each channel, as well as channel characteristic information, such as a sound field type, a sampling rate, a bit rate, etc.

When the first to-be-presented audio signal or the second to-be-presented audio signal is the code stream based on the above three signals, such as the WANOS code stream, the audio code stream is decoded according to the code stream decoding description of the above three signals, to obtain an audio content signal of each channel, as well as channel characteristic information, such as a sound field type, a sampling rate, a bit rate, etc., so as to obtain an audio content signal of an object, as well as metadata of the object, such as a size of the object, three-dimensional spatial information, etc.

Next, as shown in FIG. 4, the first wireless earphone performs a rendering operation using the first decoded audio signal and rendering metadata D3, thereby obtaining a first audio playing signal. Similarly, the second wireless earphone performs a rendering operation using the second decoded audio signal and rendering metadata D5, thereby obtaining a second audio playing signal. Moreover, the first audio playing signal and the second audio playing signal are not separated, but are closely related according to the distribution of the to-be-presented audio signal and an association parameter used in the rendering process, such as the HRTF (Head Related Transfer Function) database. It should be noted that, a person skilled in the art may select the association parameter according to an actual situation, and the association parameter may also be an association algorithm, which is not limited in the present application.

After the first audio playing signal and the second audio playing signal which have the inseparable relation are played by a wireless earphone such as a TWS true wireless earphone, a complete three-dimensional stereo binaural sound field can be formed, so that the binaural sound field with approximately 0 delay can be obtained without excessive involvement of the playing device in rendering, and thus the quality of sound played by the earphone can be greatly improved.

In the rendering process, regarding the rendering process of the first audio playing signal, the first decoded audio signal and the rendering metadata D3 play a very important role in the whole rendering process. Similarly, regarding the rendering process of the second audio playing signal, the second decoded audio signal and the rendering metadata D5 play a very important role in the whole rendering process.

For convenience of explaining that the first wireless earphone and the second wireless earphone, when performing rendering, are still in association rather than in isolation, two implementations in which the first wireless earphone and the second wireless earphone synchronously perform rendering are illustrated below with reference to FIG. 5 and FIG. 6. The so-called synchronization does not mean simultaneity but mean mutual coordination to achieve optimal rendering effects.

It should be noted that the first decoded audio signal and the second decoded audio signal may include, but are not limited to, an audio content signal of a channel, an audio content signal of an object, and/or a scene content audio signal. The metadata may include, but is not limited to, channel characteristic information such as sound field type, sampling rate, bit rate, etc.; three-dimensional spatial information of the object; and rendering metadata at the earphone side. For example, the rendering metadata at the earphone side may include, but is not limited to, sensor metadata and an HRTF database. Since the scene content audio signal such as FOA/HOA can be regarded as a special spatially structured channel signal, the following rendering of the channel information is equally applicable to the scene content audio signal.

Figure 5:
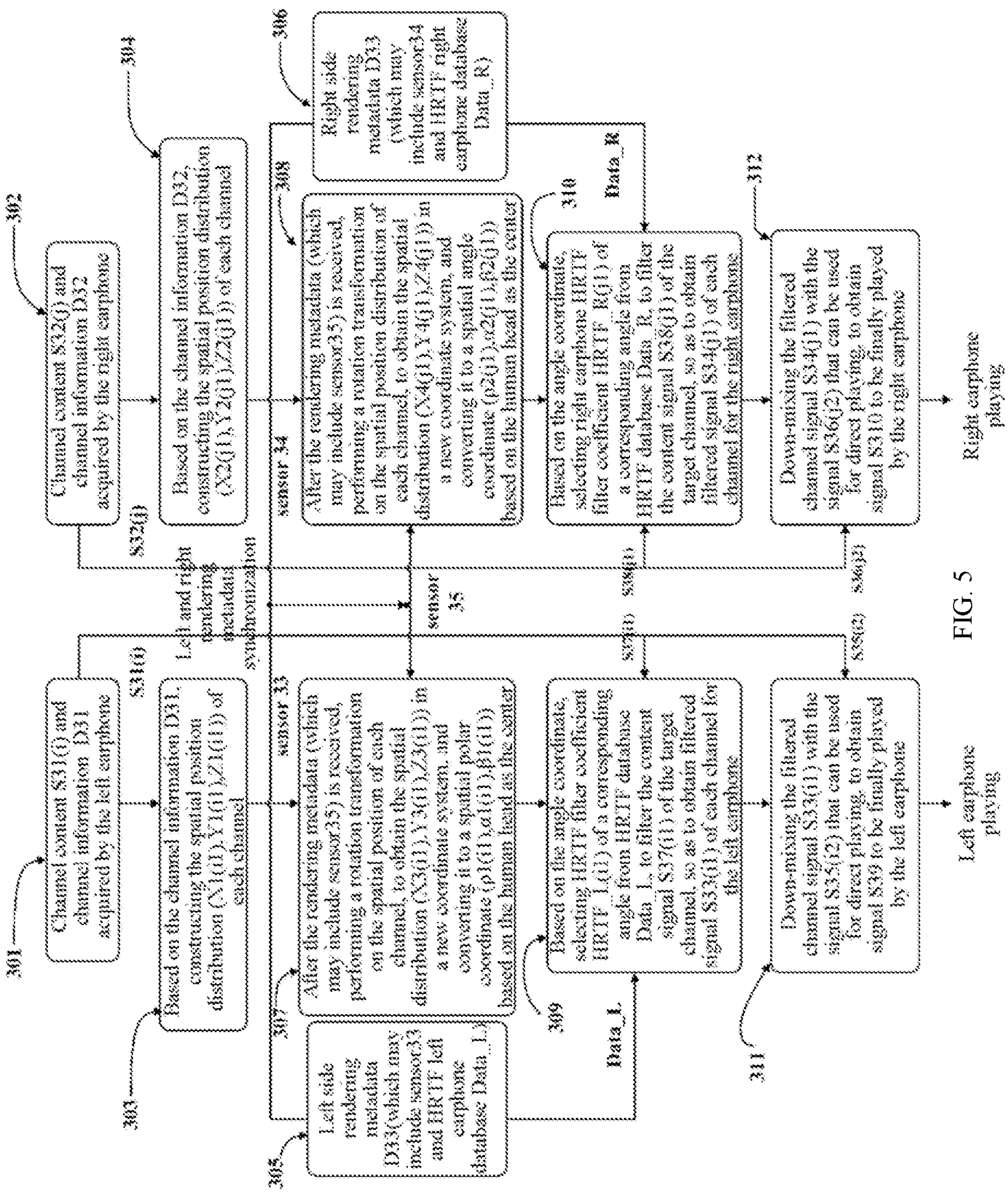
FIG. 5 is a schematic diagram of an HRTF rendering method according to an embodiment of the present application.

FIG. 5 is a schematic diagram of an HRTF rendering method according to an embodiment of the present application. As shown in FIG. 5, when the input first decoded audio signal and the input second decoded audio signal are audio signals regarding channel information, a specific rendering process as shown in FIG. 5 is as follows.

An audio receiving unit 301 receives channel information D31 and content S31($i$), i.e., the first decoded audio signal, incoming to the left earphone, where $1 \le i \le N$, and N is the number of channels received by the left earphone. An audio receiving unit 302 receives channel information D32 and content S32($j$), i.e., the second decoded audio signal, incoming to the right earphone, where $1 \le j \le M$, and M is the number of channels received by the right earphone. The content S31($i$) and S32($j$) may be completely identical or partially identical. The S31($i$) contains a signal S37($i$1) to be HRTF filtered, where $1 \le i1 \le N1 \le N$, and N1 represents the number of channels for which the left earphone requires HRTF filtering processing; and can also contains S35($i$2) without filter processing, where $1 \le i2 \le N2$, and N2 represents the number of channels for which the left earphone does not require HRTF filter processing, where N2=N−N1. S32(*j*) contains a signal S38(*j*1) to be HRTF filtered, where 1≤j1≤M1≤M, and M1 represents the number of channels for which the right earphone requires HRTF filtering processing; and can also contains S36(*j*2) without filter processing, where 1≤j2≤M2, and M2 represents the number of channels for which the right earphone does not require HRTF filter processing, where M2=M−M1. Theoretically, N2 also can be equal to 0, which means that there is no channel signal S35 without HRTF filtering in the left earphone. Similarly, M2 also can be equal to 0, which means that there is no channel signal S36 without HRTF filtering in the right earphone. N2 may be equal to or may not be equal to M2. The channels that need HRTF filtering processing must be the same, that is, N1=M1, and the corresponding signal content must be the same, that is, S37=S38. S37 is a set of signals S37(*i*1) to be filtered in the left earphone and, similarly, S38 is a set of signals S38(*j*1) to be filtered in the right earphone. Besides, the audio receiving units 301 and 302 transmit channel characteristic information D31 and D32 to three-dimensional spatial coordinate constructing units 303 and 304, respectively.

The spatial coordinate constructing units 303 and 304, upon receiving the respective channel information, construct three-dimensional spatial position distributions (X1(*i*1),Y1(*i*1),Z1(*i*1)) and (X2(*j*1),Y2(*j*1),Z2(*j*1)) of the respective channels, and then transmit the spatial positions of the respective channels to spatial coordinate conversion units 307 and 308, respectively.

A metadata unit 305 provides rendering metadata used by the left earphone for the entire rendering system, which may include sensor metadata sensor 33 (to be transmitted to 307) and an HRTF database Data_L used by the left earphone (to be transmitted to a filter processing unit 309). Similarly, a metadata unit 306 provides rendering metadata used by the right earphone for the entire rendering system, which may include sensor metadata sensor 34 (to be transmitted to 308) and an HRTF database Data_R used by the right earphone (to be transmitted to a filtering processing unit 310). Before the metadata sensor 33 and sensor 34 are respectively sent to 307 and 308, the sensor metadata needs to be synchronized.

In one possible design, before the rendering processing is performed, the audio processing method further includes:

synchronizing, by the first wireless earphone, the rendering metadata with the second wireless earphone.

In an embodiment, if the first wireless earphone is provided with an earphone sensor, the second wireless earphone is not provided with an earphone sensor, and the playing device is not provided with a playing device sensor, synchronizing, by the first wireless earphone, the rendering metadata with the second wireless earphone includes:

sending, by the first wireless earphone, the first earphone sensor metadata to the second wireless earphone, so that the second wireless earphone uses the first earphone sensor metadata as the second earphone sensor metadata.

In another possible design, if each of the first wireless earphone and the second wireless earphone is provided with an earphone sensor and the playing device is not provided with a playing device sensor, synchronizing, by the first wireless earphone, the rendering metadata with the second wireless earphone includes:

sending, by the first wireless earphone, the first earphone sensor metadata to the second wireless earphone, and sending, by the second wireless earphone, the second earphone sensor metadata to the first wireless earphone; and determining, by the first wireless earphone and the second wireless earphone respectively, the rendering metadata according to the first earphone sensor metadata, the second earphone sensor metadata and a preset numerical algorithm, or sending, by the first wireless earphone, the first earphone sensor metadata to the playing device and sending, by the second wireless earphone, the second earphone sensor metadata to the playing device, so that the playing device determines the rendering metadata according to the first earphone sensor metadata, the second earphone sensor metadata and a preset numerical algorithm; and receiving, by the first wireless earphone and the second wireless earphone respectively, the rendering metadata.

Further, if the first wireless earphone is provided with an earphone sensor, the second wireless earphone is not provided with an earphone sensor and the playing device is provided with a playing device sensor, synchronizing, by the first wireless earphone, the rendering metadata with the second wireless earphone includes:

sending, by the first wireless earphone, the first earphone sensor metadata to the playing device, so that the playing device determines the rendering metadata according to the first earphone sensor metadata, the playing device sensor metadata and a preset numerical algorithm; and receiving, by the first wireless earphone and the second wireless earphone respectively, the rendering metadata; or receiving, by the first wireless earphone, playing device sensor metadata sent by the playing device;

determining, by the first wireless earphone, the rendering metadata according to the first earphone sensor metadata, the playing device sensor metadata and a preset numerical algorithm; and sending, by the first wireless earphone, the rendering metadata to the second wireless earphone.

In another possible design, if each of the first wireless earphone and the second wireless earphone is provided with an earphone sensor and the playing device is provided with a playing device sensor, synchronizing, by the first wireless earphone, the rendering metadata with the second wireless earphone includes:

sending, by the first wireless earphone, the first earphone sensor metadata to the playing device, and sending, by the second wireless earphone, the second earphone sensor metadata to the playing device, so that the playing device determines the rendering metadata according to the first earphone sensor metadata, the second earphone sensor metadata, the playing device sensor metadata and a preset numerical algorithm; and receiving, by the first wireless earphone and the second wireless earphone respectively, the rendering metadata, or sending, by the first wireless earphone, the first earphone sensor metadata to the second wireless earphone, and sending, by the second wireless earphone, the second earphone sensor metadata to the first wireless earphone;

receiving, by the first wireless earphone and the second wireless earphone respectively, the playing device sensor metadata; and determining, by the first wireless earphone and the second wireless earphone respectively, the rendering metadata according to the first earphone sensor metadata, the second earphone sensor metadata, the playing device sensor metadata and a preset numerical algorithm.

In an embodiment, the rendering metadata includes at least one of first wireless earphone metadata, second wireless earphone metadata and playing device metadata.

Specifically, the first wireless earphone metadata includes first earphone sensor metadata and a head related transfer function HRTF database, where the first earphone sensor metadata is used to characterize a motion characteristic of the first wireless earphone, the second wireless earphone metadata includes second earphone sensor metadata and a head related transfer function HRTF database, where the second earphone sensor metadata is used to characterize a motion characteristic of the second wireless earphone, and the playing device metadata includes playing device sensor metadata, where the playing device sensor metadata is used to characterize a motion characteristic of the playing device.

Specifically, as shown in FIG. 5, synchronization implementations include, but are not limited to, the following.

(1) When only one of the earphones has a sensor that can provide metadata about head rotation, the synchronization method includes, but is not limited to, transferring the metadata in this earphone to the other earphone. For example, when only the left earphone has a sensor, head rotation metadata sensor 33 is generated on the left earphone side, and the metadata is wirelessly transmitted to the right earphone to generate sensor 34. At this time, sensor 33=sensor 34 and, after synchronization, sensor 35=sensor 33.

(2) When two earphones both have sensors, sensor data sensor 33 and sensor 34 are respectively generated on the two sides, at this time, the synchronization method includes, but is not limited to: a. wirelessly transmitting, between the earphones, the metadata on the two sides (the left sensor 33 is transmitted into the right earphone; the right sensor 34 is transmitted into the left earphone), and then performing numerical value synchronization processing respectively on the two earphone terminals, to generate sensor 35; b. or transmitting the sensor metadata on the two earphone sides into a former stage equipment, and after the former stage equipment carries out synchronous data processing, then wirelessly transmitting the processed sensor 35 into the two earphone sides respectively, for use in 307 and 308.

(3) When the former stage equipment can also provide the corresponding sensor metadata sensor 0, if only one earphone has a sensor, for example, only the left earphone has a sensor and sensor 33 is generated, the synchronization method then includes but is not limited to: a. transmitting the sensor 33 to the former stage equipment, after the former stage equipment performs numerical processing based on sensor 0 and sensor 33, wirelessly transmitting the processed sensor 35 to the left and right earphones, for use in 307 and 308; b. transmitting the sensor metadata sensor 0 of the former stage equipment to the earphone side, performing numerical processing with combination of sensor 0 and sensor 33 at the left earphone to obtain sensor 35, and concurrently transmitting sensor 35 to the right earphone terminal in a wireless manner; and finally for use in 307 and 308.

(4) When the former stage equipment can provide the corresponding sensor metadata sensor 0, and the earphones on two sides both have sensors and the corresponding metadata sensor 33 and sensor 34 are generated, the synchronization method then includes, but is not limited to: a. transmitting metadata sensor 33 and sensor 34 on the two earphone sides to the former stage equipment, performing data integration and calculation with combination of 3 sets of metadata in the former stage equipment, to obtain final synchronized metadata sensor 35, and then transmitting the data to the two earphone sides for use in 307 and 308; b. wirelessly transmitting the metadata sensor 0 of the former stage equipment to the two earphone sides, concurrently transmitting the metadata on the left and right earphones mutually, and then performing, on the two earphone sides, data integration and calculation respectively on the 3 sets of metadata, to obtain the sensor 35 for use in 307 and 308.

In the present embodiment, the sensor metadata sensor 33 or sensor 34 may be provided by, but not limited to, a combination of a gyroscope sensor, a geomagnetic device, and an accelerometer; the HRTF refers to a head related transfer function. The HRTF database can be based on, but not limited to, other sensor metadata at the earphone side (for example, a head-size sensor), or based on a capturing- or photographing-enabled frontend equipment which, after performing intelligent head recognition makes personalized selection, processing and adjustment according to the listener's head, ears and other physical characteristics to achieve personalized effects. The HRTF database can be stored in the earphone side in advance, or a new HRTF database can be subsequently imported therein via a wired or wireless mode to update the HRTF database, so as to achieve the purpose of personalization as stated above.

The spatial coordinate conversion units 307 and 308, after receiving the synchronized metadata sensor 35, respectively perform rotation transformation on the spatial positions (X1(*i*1),Y1(*i*1),Z1(*i*1)) and (X2(*j*1),Y2(*j*1),Z2(*j*1)) of the channels of the left and right earphones to obtain the rotated spatial positions (X3(*i*1),Y3(*i*1),Z3(*i*1)) and (X4(*j*1),Y4(*j*1),Z4(*j*1)), where the rotation method is based on a general three-dimensional coordinate system rotation method and is not described herein again. Then, they are converted to polar coordinates (ρ1(*i*1),α1(*i*1),(β1(*i*1)) and (ρ2(*j*1),α2(*j*1),(β2(*j*1)) based on the human head as the center. The specific conversion method may be calculated according to a conversion method of a general Cartesian coordinate system and a polar coordinate system, and is not described herein again.

Based on angles α1(*i*1),β1(*i*1) and α2(*j*1),(β2(*j*1) in the polar coordinate system, the filter processing units 309 and 310 select corresponding HRTF data set HRTF_L(i1) and HRTF_R(j1) from a left-earphone HRTF database Data_L introduced from the metadata unit 305 and a right-earphone HRTF database Data_R introduced from 306, respectively. Then, HRTF filtering is performed on channel signals S37(*i*1) and S38(*j*1) to be virtually processed, introduced from the audio receiving units 301 and 302, so as to obtain the filtered virtual signal S33(*i*1) of each channel at the left earphone terminal, and the filtered virtual signal S34(*j*1) of each channel at the right earphone terminal.

A down-mixing unit 311, upon receiving the data S33(*i*1) filtered and rendered by the above 309 and the channel signal S35(*i*2) transmitted by 301 that does not require HRTF filtering processing, down-mixes N channel information to obtain an audio signal S39 which can be finally used for the left earphone to play. Similarly, a down-mixing unit 312, upon receiving the data S34(*j*1) filtered and rendered by the above 310 and the channel signal S36(*j*2) transmitted by 302 that does not require HRTF filtering processing, down-mixes M channel information to obtain an audio signal S310 which can be finally used for the right earphone to play.

In the present embodiment, since the HRTF database may have limited accuracy, when in calculation, an interpolation method may be considered to use, to obtain an HRTF data set [2] of corresponding angles. In addition, further processing steps may be added at 311 and 312, including, but not limited to, equalization (EQ), delay, reverberation, and other processing.

Further, in an embodiment, before the HRTF virtual rendering (that is, before 301 and 302), preprocessing may be added, which may include, but is not limited to, channel rendering, object rendering, scene rendering and other rendering methods.

Figure 6:
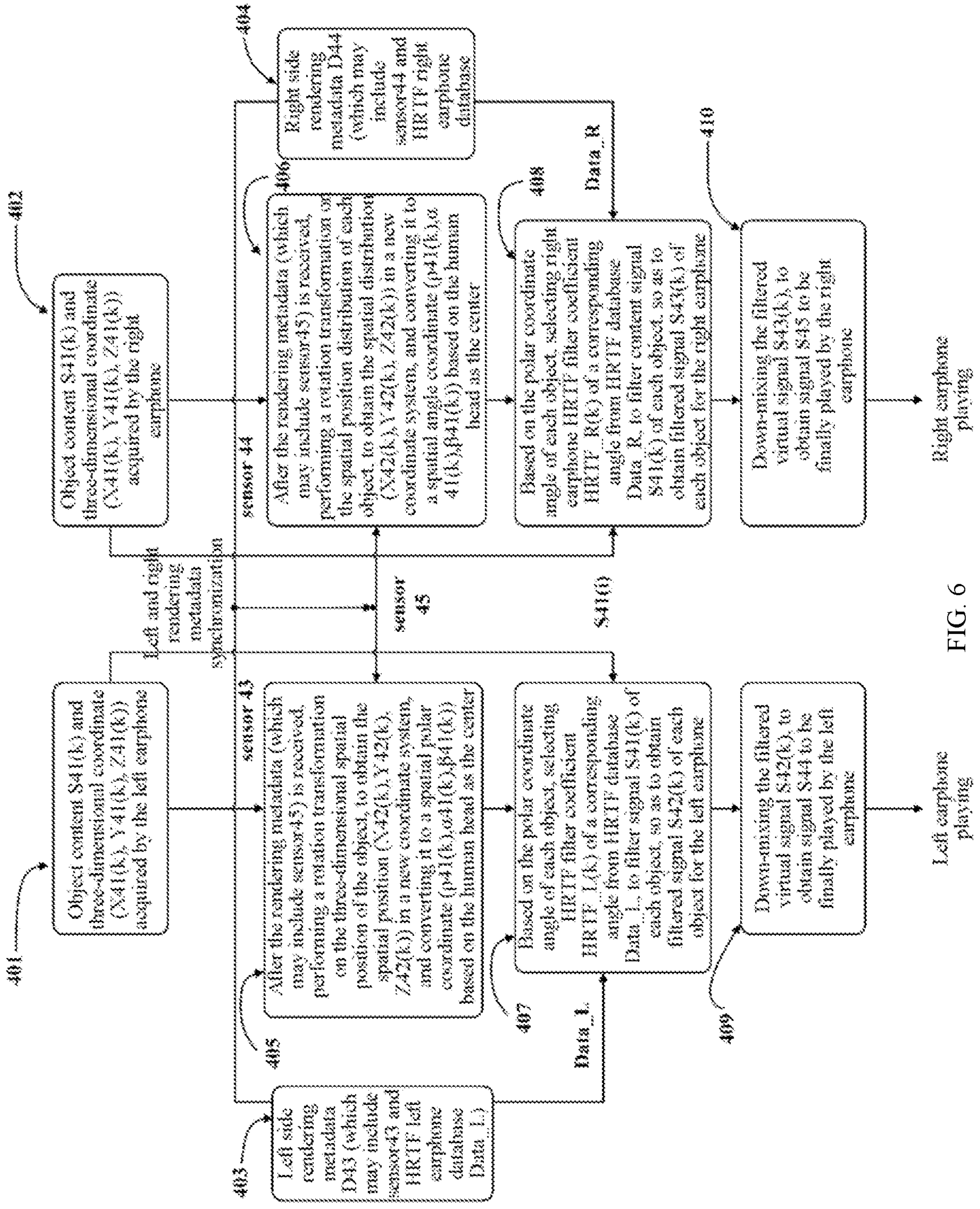
FIG. 6 is a schematic diagram of another HRTF rendering method according to an embodiment of the present application.

In addition, when the audio signals input to the rendering part, that is, the first decoded audio signal and the second decoded audio signal, are about objects, the processing method and flow thereof are shown in FIG. 6.

FIG. 6 is a schematic diagram of another HRTF rendering method according to an embodiment of the present application. As shown in FIG. 6, audio receiving units 401 and 402 both receive object content S41(*k*) and corresponding three-dimensional coordinates (X41(*k*), Y41(*k*), Z41(*k*)), where 1≤k≤K, and K is the number of objects.

A metadata unit 403 part provides metadata for the left earphone rendering of the entire object, including sensor metadata sensor 43 and a left earphone HRTF database Data_L. Similarly, a metadata unit 404 part provides metadata for the right earphone rendering of the entire object, including sensor metadata sensor 44 and a right-earphone HRTF database Data_R. When the sensor metadata is transmitted to a spatial coordinate conversion unit 405 or 406, data synchronization processing is required. The processing methods include, but are not limited to, the four methods described in the metadata units 305 and 306, and finally the synchronized sensor metadata sensor 45 is transmitted to 405 and 406 respectively.

In the present embodiment, the sensor metadata sensor 43 or sensor 44 can be, but not limited to, provided by a combination of a gyroscope sensor, a geomagnetic device, and an accelerometer. The HRTF database can be based on, but not limited to, other sensor metadata at the earphone side (for example, a head-size sensor), or based on a capturing- or photographing-enabled frontend equipment which, after performing intelligent head recognition, makes personalized processing and adjustment according to the listener's head, ears and other physical characteristics to achieve personalized effects. The HRTF database can be stored in the earphone side in advance, or a new HRTF database can be subsequently imported therein via a wired or wireless mode to update the HRTF database, so as to achieve the purpose of personalization as stated above.

The spatial coordinate conversion units 405 and 406, after receiving the sensor metadata sensor 45, respectively perform rotation transformation on a spatial coordinate (X41(*k*),Y41(*k*),Z41(*k*)) of the object, to obtain a spatial coordinate (X42(*k*), Y42(*k*), Z42(*k*)) in a new coordinate system, and then perform conversion in a polar coordinate system to obtain a polar coordinate (ρ41(*k*),α41(*k*),(β41(*k*)) with the human head as the center.

Filter processing units 407 and 408, after receiving the polar coordinate (ρ41(*k*),α41(*k*),(β1(*k*)) of each object, select a corresponding HRTF data set HRTF_L(k) and HRTF_R(k) from the Data_L input from 403 to 407 and the Data_R input from 404 to 408 respectively according to their distance and angle information.

A down-mixing unit 409 performs down-mixing after receiving the virtual signal S42(*k*) of each object transmitted by 407, and obtains an audio signal S44 that can finally be played by the left earphone. Similarly, a down-mixing unit 410 performs down-mixing after receiving the virtual signal S43(*k*) of each object transmitted by 408, and obtains an audio signal S45 that can finally be played by the right earphone. S44 and S45 played by the left and right earphone terminals together create the target sound and effect.

In the present embodiment, since the HRTF database may have limited accuracy, when in calculation, an interpolation method may be considered to use, to obtain an HRTF data set [2] of corresponding angles. In addition, further processing steps can be added in the down-mixing units 409 and 410, including, but not limited to, equalization (EQ), delay, reverberation and other processing.

Further, in an embodiment, before HRTF virtual rendering (that is, before 301 and 302), pre-processing may be added, which may include, but is not limited to, channel rendering, object rendering, scene rendering and other rendering methods.

This form of binaural segmentation processing has never been realized.

Although processing is performed in the two earphones separately, it does not mean in isolation, and the processed audios in the two earphones can be meaningfully combined into a complete binaural sound field (not only sensor data but also audio data should be synchronized).

After the separate processing in the two earphones, since each earphone only processes the data of its own channel, the total time is halved, saving computing power. At the same time, the memory and speed requirements on a chip of each earphone are also halved, which means that more chips are competent for processing work.

In terms of reliability, in the prior art, if processing modules cannot work, the final output may be silence or noise; in the embodiments of the present application, when the processing module of any one of the earphones fails to work, the other earphone can still work, and the audios of the two channels can be simultaneously acquired, processed and output through the communication with the former stage equipment.

It should be noted that, in an embodiment, the earphone sensor includes at least one of a gyroscope sensor, a head-size sensor, a ranging sensor, a geomagnetic sensor and an acceleration sensor, and/or the playing device sensor includes at least one of a gyroscope sensor, a head-size sensor, a ranging sensor, a geomagnetic sensor and an acceleration sensor.

S303, the first wireless earphone plays the first audio playing signal, and the second wireless earphone plays the second audio playing signal.

In this step, the first audio playing signal and the second audio playing signal together construct a complete sound field to form a three-dimensional stereo surround, and the first wireless earphone and the second wireless earphone are relatively independent with respect to the playing device, i.e., there is no relatively large time delay between the wireless earphone and the playing device as in the existing wireless earphone technology. That is, according to the technical solution of the present application, the audio signal rendering function is transferred from the playing device side to the wireless earphone side, so that the delay can be greatly shortened, thereby improving the response speed of the wireless earphone to head movement, and thus improving the sound effect of the wireless earphone.

The present application provides an audio processing method. The first wireless earphone receives the first to-be-presented audio signal sent by the playing device, and the second wireless earphone receives the second to-be-presented audio signal sent by the playing device. Then, the first wireless earphone performs rendering processing on the first to-be-presented audio signal to obtain the first audio playing signal, and the second wireless earphone performs rendering processing on the second to-be-presented audio signal to obtain the second audio playing signal. Finally, the first wireless earphone plays the first audio playing signal, and the second wireless earphone plays the second audio playing signal. Therefore, it is possible to achieve technical effects of greatly reducing the delay and improving the sound quality of the earphone since the wireless earphone can render the audio signals independently of the playing device.

The above content is based on a pair of earphones. When the playing device and multiple pairs of wireless earphones such as TWS earphones work together, reference may be made to the way in which the channel information and/or the object information is rendered in the pair of earphones. The difference is shown in FIG. 7.

Figure 7:
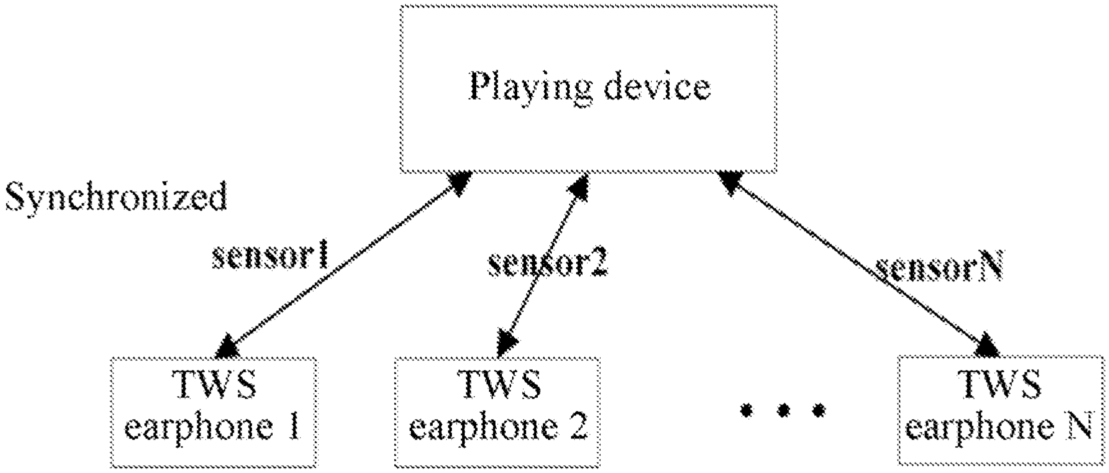
FIG. 7 is a schematic diagram of an application scenario in which multiple pairs of wireless earphones are connected to a playing device according to an embodiment of the present application.

FIG. 7 is a schematic diagram of an application scenario in which multiple pairs of wireless earphones are connected to a playing device according to an embodiment of the present application. As shown in FIG. 7, the sensor metadata generated by different pairs of TWS earphones can be different. The metadata sensor 1, sensor 2 . . . sensor N generated after coupling and synchronizing with the sensor metadata of the playing device can be the same, partially the same, or even completely different, where N is the number of pairs of TWS earphones. Therefore, when channel or object information is rendered as described above, the only change is that the rendering metadata input by the earphone side is different. Therefore, the three-dimensional spatial position of each channel or object presented by different earphones will also be different. Finally, the sound field presented by different TWS earphones will also be different according to the user's location or direction.

Figure 8:
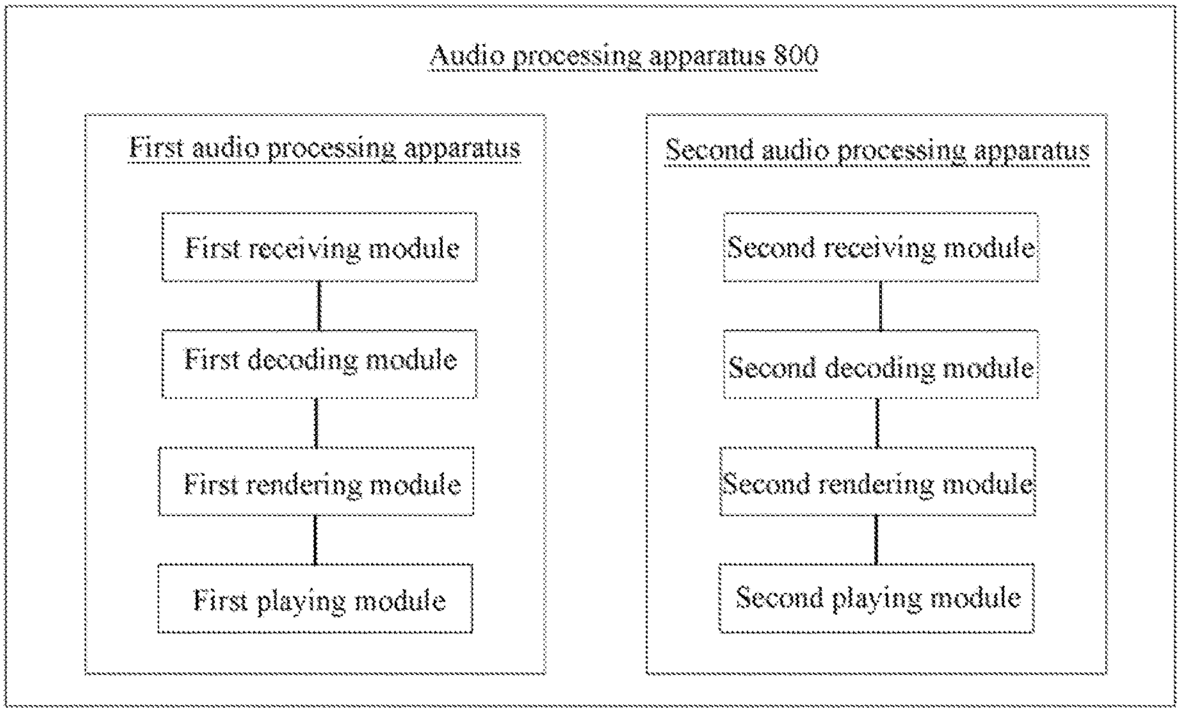
FIG. 8 is a schematic structural diagram of an audio processing apparatus according to an embodiment of the present application.

FIG. 8 is a schematic structural diagram of an audio processing apparatus according to an embodiment of the present application. As shown in FIG. 8, the audio processing apparatus 800 provided in the present embodiment includes:

a first audio processing apparatus and a second audio processing apparatus;

where the first audio processing apparatus includes:

a first receiving module, configured to receive a first to-be-presented audio signal sent by a playing device;

a first rendering module, configured to perform rendering processing on the first to-be-presented audio signal to obtain a first audio playing signal; and a first playing module, configured to play the first audio playing signal, and the second audio processing apparatus includes:

a second receiving module, configured to receive a second to-be-presented audio signal sent by the playing device;

a second rendering module, configured to perform rendering processing on the second to-be-presented audio signal to obtain a second audio playing signal; and a second playing module, configured to play the second audio playing signal.

In one possible design, the first audio processing apparatus is a left-earphone audio processing apparatus and the second audio processing apparatus is a right-earphone audio processing apparatus, the first audio playing signal is used to present a left-ear audio effect and the second audio playing signal is used to present a right-ear audio effect, to form a binaural sound field when the first audio processing apparatus plays the first audio playing signal and the second audio processing apparatus plays the second audio playing signal.

In one possible design, the first audio processing apparatus further includes:

a first decoding module, configured to perform decoding processing on the first to-be-presented audio signal, to obtain a first decoded audio signal; and the first rendering module is specifically configured to: perform rendering processing according to the first decoded audio signal and rendering metadata, to obtain the first audio playing signal, and the second audio processing apparatus further includes:

a second decoding module, configured to perform decoding processing on the second to-be-presented audio signal, to obtain a second decoded audio signal; and the second rendering module is specifically configured to: perform rendering processing according to the second decoded audio signal and rendering metadata, to obtain the second audio playing signal.

In one possible design, the rendering metadata includes at least one of first wireless earphone metadata, second wireless earphone metadata and playing device metadata.

In one possible design, the first wireless earphone metadata includes first earphone sensor metadata and a head related transfer function HRTF database, where the first earphone sensor metadata is used to characterize a motion characteristic of the first wireless earphone, the second wireless earphone metadata includes second earphone sensor metadata and a head related transfer function HRTF database, where the second earphone sensor metadata is used to characterize a motion characteristic of the second wireless earphone, and the playing device metadata includes playing device sensor metadata, where the playing device sensor metadata is used to characterize a motion characteristic of the playing device.

In one possible design, the first audio processing apparatus further includes:

a first synchronizing module, configured to synchronize the rendering metadata with the second wireless earphone, and/or the second audio processing apparatus further includes:

a second synchronizing module, configured to synchronize the rendering metadata with the first wireless earphone.

In one possible design, the first synchronizing module is specifically configured to: send the first earphone sensor metadata to the second wireless earphone, so that the second synchronizing module uses the first earphone sensor metadata as the second earphone sensor metadata.

In one possible design, the first synchronizing module is specifically configured to:

send the first earphone sensor metadata;

receive the second earphone sensor metadata; and determine the rendering metadata according to the first earphone sensor metadata, the second earphone sensor metadata and a preset numerical algorithm, and the second synchronizing module is specifically configured to:

send the second earphone sensor metadata;

receive the first earphone sensor metadata; and determine the rendering metadata according to the first earphone sensor metadata, the second earphone sensor metadata and a preset numerical algorithm, or the first synchronizing module is specifically configured to:

send the first earphone sensor metadata; and receive the rendering metadata, and the second synchronizing module is specifically configured to:

send the second earphone sensor metadata; and receive the rendering metadata.

In one possible design, the first synchronizing module is specifically configured to:

receive playing device sensor metadata;

determine the rendering metadata according to the first earphone sensor metadata, the playing device sensor metadata and a preset numerical algorithm; and send the rendering metadata.

In one possible design, the first synchronizing module is specifically configured to:

send the first earphone sensor metadata;

receive the second earphone sensor metadata;

receive the playing device sensor metadata; and determine the rendering metadata according to the first earphone sensor metadata, the second earphone sensor metadata, the playing device sensor metadata and a preset numerical algorithm, and the second synchronizing module is specifically configured to:

send the second earphone sensor metadata;

receive the first earphone sensor metadata;

receive the playing device sensor metadata; and determine the rendering metadata according to the first earphone sensor metadata, the second earphone sensor metadata, the playing device sensor metadata and a preset numerical algorithm.

In an embodiment, the first to-be-presented audio signal includes at least one of a channel-based audio signal, an object-based audio signal, and a scene-based audio signal, and/or the second to-be-presented audio signal includes at least one of a channel-based audio signal, an object-based audio signal, and a scene-based audio signal.

It is worth noting that the audio processing apparatus 800 provided in the embodiment shown in FIG. 8 can execute the method corresponding to the playing device side provided in any of the foregoing method embodiments; and specific implementation principles, technical features, technical terms and technical effects therebetween are similar and will not be described herein again.

Figure 9:
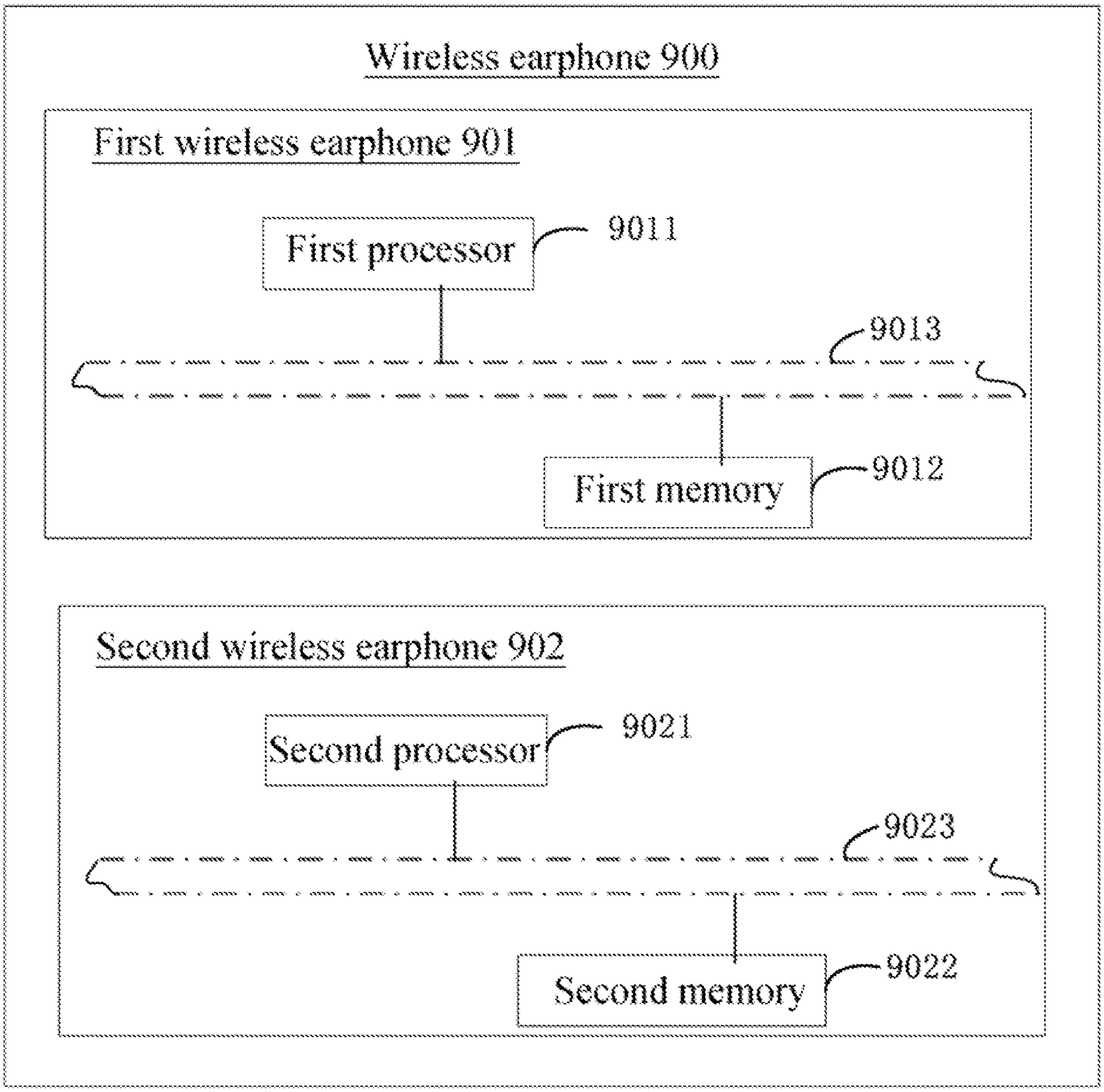
FIG. 9 is a schematic structural diagram of a wireless earphone according to an embodiment of the present application.

FIG. 9 is a schematic structural diagram of a wireless earphone according to an embodiment of the present application. As shown in FIG. 9, the wireless earphone 900 may include: a first wireless earphone 901 and a second wireless earphone 902.

The first wireless earphone 901 includes:

a first processor 9011; and a first memory 9012, configured to store a computer program of the first processor 9011, where the first processor 9011 is configured to implement the steps of the first wireless earphone of any possible audio processing method in the above method embodiments by executing the computer program, and the second wireless earphone 902 includes:

a second processor 9021; and a second memory 9022, configured to store a computer program of the second processor 9021, where the second processor 9021 is configured to implement the steps of the second wireless earphone of any possible audio processing method in the above method embodiments by executing the computer program.

Each of the first processor 901 and the second processor 902 has at least one processor and a memory. FIG. 9 shows an electronic device taking one processor as an example.

The first memory 9012 and the second memory 9022 are used to store programs. Specifically, the programs may include program codes, and the program codes include computer operation instructions.

The first memory 9012 and the second memory 9022 may include a high-speed RAM memory, and may also include a non-volatile memory, such as at least one disk memory.

The first processor 9011 is configured to execute computer-executable instructions stored in the first memory 9012 to implement the steps of the first wireless earphone in the audio processing method described in the above method embodiments.

The first processor 9011 and the second processor 9021 are respectively configured to execute computer-executable instructions stored in the first memory 9012 and the second memory 9022 to implement the steps of the second wireless earphone in the audio processing method described in the above method embodiments.

The first processor 9011 or the second processor 9021 may be a central processing unit (briefly as CPU), or an application specific integrated circuit (briefly as ASIC), or may be one or more integrated circuits configured to implement embodiments of the present application.

In an embodiment, the first memory 9012 may be standalone or integrated with the first processor 9011. When the first memory 9012 is a device independently of the first processor 9011, the first wireless earphone 901 may further include:

a first bus 9013 configured to connect the first processor 9011 and the first memory 9012. The bus may be an industry standard architecture (briefly as ISA) bus, a peripheral component interconnect (PCI) bus, an extended industry standard architecture (EISA) bus, or the like. The buses may be classified as an address bus, a data bus, a control bus, etc., but do not mean that there is only one bus or one type of buses.

In an embodiment, the second memory 9022 may be standalone or integrated with the second processor 9021. When the second memory 9022 is a device independently of the second processor 9021, the second wireless earphone 902 may further include:

a second bus 9023 configured to connect the second processor 9021 and the second memory 9022. The bus may be an industry standard architecture (briefly as ISA) bus, a peripheral component interconnect (PCI) bus, an extended industry standard architecture (EISA) bus, or the like. The buses may be classified as an address bus, a data bus, a control bus, etc., but do not mean that there is only one bus or one type of buses.

In an embodiment, in a specific implementation, if the first memory 9012 and the first processor 9011 are implemented by being integrated on a chip, the first memory 9012 and the first processor 9011 may complete communication through an internal interface.

In an embodiment, in a specific implementation, if the second memory 9022 and the second processor 9021 are implemented by being integrated on a chip, the second memory 9022 and the second processor 9021 may complete communication through an internal interface.

The present application also provides a computer-readable storage medium, which may include: various media that can store program codes, such as a USB flash disk, a mobile hard disk, a read-only memory (ROM), a random access memory (RAM), a magnetic disk or an optical disk. In particular, the computer-readable storage medium stores program instructions for the method in the above embodiments.

Finally, it should be noted that the above embodiments are only used to illustrate the technical solutions of the present application, not to limit it. Although the present application has been described in detail with reference to the above-mentioned embodiments, those skilled in the art should understand that they may still modify the technical solutions recorded in the above-mentioned embodiments, or equivalently replace some or all of the technical features. However, these modifications or substitutions do not make the essence of the corresponding technical solutions depart from the scope of the technical solutions of the embodiments of the present application.

What is claimed is:

1. An audio processing method applied to a wireless earphone comprising a first wireless earphone and a second wireless earphone, wherein the first wireless earphone and the second wireless earphone are used to establish a wireless connection with a playing device, and the method comprises:

receiving, by the first wireless earphone, a first to-be-presented audio signal sent by the playing device, and receiving, by the second wireless earphone, a second to-be-presented audio signal sent by the playing device;

performing, by the first wireless earphone, rendering processing on the first to-be-presented audio signal to obtain a first audio playing signal, and performing, by the second wireless earphone, rendering processing on the second to-be-presented audio signal to obtain a second audio playing signal; and playing, by the first wireless earphone, the first audio playing signal, and playing, by the second wireless earphone, the second audio playing signal;

wherein if the first wireless earphone is a left-ear wireless earphone and the second wireless earphone is a right-ear wireless earphone, the first audio playing signal is used to present a left-ear audio effect and the second audio playing signal is used to present a right-ear audio effect, to form a binaural sound field when the first wireless earphone plays the first audio playing signal and the second wireless earphone plays the second audio playing signal;

wherein before the first wireless earphone performs the rendering processing on the first to-be-presented audio signal, the audio processing method further comprises:

performing, by the first wireless earphone, decoding processing on the first to-be-presented audio signal to obtain a first decoded audio signal, correspondingly, performing, by the first wireless earphone, the rendering processing on the first to-be-presented audio signal comprises:

performing, by the first wireless earphone, the rendering processing according to the first decoded audio signal and rendering metadata, to obtain the first audio playing signal, and before the second wireless earphone performs the rendering processing on the second to-be-presented audio signal, the audio processing method further comprises:

performing, by the second wireless earphone, decoding processing on the second to-be-presented audio signal, to obtain a second decoded audio signal, correspondingly, performing, by the second wireless earphone, the rendering processing on the second to-be-presented audio signal comprises:

performing, by the second wireless earphone, the rendering processing according to the second decoded audio signal and rendering metadata, to obtain the second audio playing signal;

wherein the rendering metadata comprises at least one of first wireless earphone metadata, second wireless earphone metadata and playing device metadata;

wherein the first wireless earphone metadata comprises first earphone sensor metadata and a head related transfer function (HRTF) database, wherein the first earphone sensor metadata is used to characterize a motion characteristic of the first wireless earphone, the second wireless earphone metadata comprises second earphone sensor metadata and a head related transfer function (HRTF) database, wherein the second earphone sensor metadata is used to characterize a motion characteristic of the second wireless earphone, and the playing device metadata comprises playing device sensor metadata, wherein the playing device sensor metadata is used to characterize a motion characteristic of the playing device;

wherein before the rendering processing is performed, the audio processing method further comprises:

synchronizing, by the first wireless earphone, the rendering metadata with the second wireless earphone.

2. The audio processing method according to claim 1, wherein if the first wireless earphone is provided with an earphone sensor, the second wireless earphone is not provided with an earphone sensor, and the playing device is not provided with a playing device sensor, synchronizing, by the first wireless earphone, the rendering metadata with the second wireless earphone comprises:

sending, by the first wireless earphone, the first earphone sensor metadata to the second wireless earphone, so that the second wireless earphone uses the first earphone sensor metadata as the second earphone sensor metadata.

3. The audio processing method according to claim 2, wherein the earphone sensor comprises at least one of a gyroscope sensor, a head-size sensor, a ranging sensor, a geomagnetic sensor and an acceleration sensor, and/or the playing device sensor comprises at least one of a gyroscope sensor, a head-size sensor, a ranging sensor, a geomagnetic sensor and an acceleration sensor.

4. The audio processing method according to claim 1, wherein if each of the first wireless earphone and the second wireless earphone is provided with an earphone sensor and the playing device is not provided with a playing device sensor, synchronizing, by the first wireless earphone, the rendering metadata with the second wireless earphone comprises:

sending, by the first wireless earphone, the first earphone sensor metadata to the second wireless earphone, and sending, by the second wireless earphone, the second earphone sensor metadata to the first wireless earphone; and determining, by the first wireless earphone and the second wireless earphone respectively, the rendering metadata according to the first earphone sensor metadata, the second earphone sensor metadata and a preset numerical algorithm, or sending, by the first wireless earphone, the first earphone sensor metadata to the playing device and sending, by the second wireless earphone, the second earphone sensor metadata to the playing device, so that the playing device determines the rendering metadata according to the first earphone sensor metadata, the second earphone sensor metadata and a preset numerical algorithm; and receiving, by the first wireless earphone and the second wireless earphone respectively, the rendering metadata.

5. The audio processing method according to claim 4, wherein if the first wireless earphone is provided with an earphone sensor, the second wireless earphone is not provided with an earphone sensor and the playing device is provided with a playing device sensor, synchronizing, by the first wireless earphone, the rendering metadata with the second wireless earphone comprises:

sending, by the first wireless earphone, the first earphone sensor metadata to the playing device, so that the playing device determines the rendering metadata according to the first earphone sensor metadata, the playing device sensor metadata and a preset numerical algorithm; and receiving, by the first wireless earphone and the second wireless earphone respectively, the rendering metadata; or receiving, by the first wireless earphone, playing device sensor metadata sent by the playing device;

determining, by the first wireless earphone, the rendering metadata according to the first earphone sensor metadata, the playing device sensor metadata and a preset numerical algorithm; and sending, by the first wireless earphone, the rendering metadata to the second wireless earphone.

6. The audio processing method according to claim 1, wherein if each of the first wireless earphone and the second wireless earphone is provided with an earphone sensor and the playing device is provided with a playing device sensor, synchronizing, by the first wireless earphone, the rendering metadata with the second wireless earphone comprises:

sending, by the first wireless earphone, the first earphone sensor metadata to the playing device, and sending, by the second wireless earphone, the second earphone sensor metadata to the playing device, so that the playing device determines the rendering metadata according to the first earphone sensor metadata, the second earphone sensor metadata, the playing device sensor metadata and a preset numerical algorithm; and receiving, by the first wireless earphone and the second wireless earphone respectively, the rendering metadata, or sending, by the first wireless earphone, the first earphone sensor metadata to the second wireless earphone, and sending, by the second wireless earphone, the second earphone sensor metadata to the first wireless earphone;

receiving, by the first wireless earphone and the second wireless earphone respectively, the playing device sensor metadata; and determining, by the first wireless earphone and the second wireless earphone respectively, the rendering metadata according to the first earphone sensor metadata, the second earphone sensor metadata, the playing device sensor metadata and a preset numerical algorithm.

7. The audio processing method according to claim 1, wherein the first to-be-presented audio signal comprises at least one of a channel-based audio signal, an object-based audio signal, a scene-based audio signal, and/or the second to-be-presented audio signal comprises at least one of a channel-based audio signal, an object-based audio signal, a scene-based audio signal.

8. The audio processing method according to claim 1, wherein the wireless connection comprises: a Bluetooth connection, an infrared connection, a WIFI connection, and a LIFI visible light connection.

9. An audio processing apparatus, comprising:

a first wireless earphone and a second wireless earphone;

the first wireless earphone comprises:

a first processor; and a first memory, configured to store a computer program of the first processor, wherein the first processor is configured to: receive a first to-be-presented audio signal sent by a playing device;

perform rendering processing on the first to-be-presented audio signal to obtain a first audio playing signal; and play the first audio playing signal, and the second wireless earphone comprises:

a second processor; and a second memory, configured to store a computer program of the second processor, wherein the second processor is configured to:

receive a second to-be-presented audio signal sent by the playing device;

perform rendering processing on the second to-be-presented audio signal to obtain a second audio playing signal; and play the second audio playing signal;

wherein the first wireless earphone is a left-ear wireless earphone and the second wireless earphone is a right-ear wireless earphone, the first audio playing signal is used to present a left-ear audio effect and the second audio playing signal is used to present a right-ear audio effect, to form a binaural sound field when the first wireless earphone plays the first audio playing signal and the second wireless earphone plays the second audio playing signal;

wherein the first processor is further configured to:

perform decoding processing on the first to-be-presented audio signal, to obtain a first decoded audio signal; and perform rendering processing according to the first decoded audio signal and rendering metadata, to obtain the first audio playing signal, and the second processor is further configured to:

perform decoding processing on the second to-be-presented audio signal, to obtain a second decoded audio signal; and perform rendering processing according to the second decoded audio signal and rendering metadata, to obtain the second audio playing signal;

wherein the rendering metadata comprises at least one of first wireless earphone metadata, second wireless earphone metadata and playing device metadata;

wherein the first wireless earphone metadata comprises first earphone sensor metadata and a head related transfer function (HRTF) database, wherein the first earphone sensor metadata is used to characterize a motion characteristic of the first wireless earphone, the second wireless earphone metadata comprises second earphone sensor metadata and a head related transfer function (HRTF) database, wherein the second earphone sensor metadata is used to characterize a motion characteristic of the second wireless earphone, and the playing device metadata comprises playing device sensor metadata, wherein the playing device sensor metadata is used to characterize a motion characteristic of the playing device;

wherein the first processor is further configured to:

synchronize the rendering metadata with the second wireless earphone.

10. The audio processing apparatus according to claim 9, wherein the second processor is further configured to:

synchronize the rendering metadata with the first wireless earphone.

11. A non-transitory computer-readable storage medium on which a computer program is stored, wherein the computer program, when being executed by a processor, implements an audio processing method, wherein the audio processing method is applied to a wireless earphone comprising a first wireless earphone and a second wireless earphone, the first wireless earphone and the second wireless earphone are used to establish a wireless connection with a playing device, and the method comprises:

receiving, by the first wireless earphone, a first to-be-presented audio signal sent by the playing device, and receiving, by the second wireless earphone, a second to-be-presented audio signal sent by the playing device;

performing, by the first wireless earphone, rendering processing on the first to-be-presented audio signal to obtain a first audio playing signal, and performing, by the second wireless earphone, rendering processing on the second to-be-presented audio signal to obtain a second audio playing signal; and playing, by the first wireless earphone, the first audio playing signal, and playing, by the second wireless earphone, the second audio playing signal;

wherein if the first wireless earphone is a left-ear wireless earphone and the second wireless earphone is a right-ear wireless earphone, the first audio playing signal is used to present a left-ear audio effect and the second audio playing signal is used to present a right-ear audio effect, to form a binaural sound field when the first wireless earphone plays the first audio playing signal and the second wireless earphone plays the second audio playing signal;

wherein before the first wireless earphone performs the rendering processing on the first to-be-presented audio signal, the audio processing method further comprises:

performing, by the first wireless earphone, decoding processing on the first to-be-presented audio signal to obtain a first decoded audio signal, correspondingly, performing, by the first wireless earphone, the rendering processing on the first to-be-presented audio signal comprises:

performing, by the first wireless earphone, the rendering processing according to the first decoded audio signal and rendering metadata, to obtain the first audio playing signal, and before the second wireless earphone performs the rendering processing on the second to-be-presented audio signal, the audio processing method further comprises:

performing, by the second wireless earphone, decoding processing on the second to-be-presented audio signal, to obtain a second decoded audio signal, correspondingly, performing, by the second wireless earphone, the rendering processing on the second to-be-presented audio signal comprises:

performing, by the second wireless earphone, the rendering processing according to the second decoded audio signal and rendering metadata, to obtain the second audio playing signal;

wherein the rendering metadata comprises at least one of first wireless earphone metadata, second wireless earphone metadata and playing device metadata;

wherein the first wireless earphone metadata comprises first earphone sensor metadata and a head related transfer function (HRTF) database, wherein the first earphone sensor metadata is used to characterize a motion characteristic of the first wireless earphone, the second wireless earphone metadata comprises second earphone sensor metadata and a head related transfer function (HRTF) database, wherein the second earphone sensor metadata is used to characterize a motion characteristic of the second wireless earphone, and the playing device metadata comprises playing device sensor metadata, wherein the playing device sensor metadata is used to characterize a motion characteristic of the playing device;

wherein before the rendering processing is performed, the audio processing method further comprises:

synchronizing, by the first wireless earphone, the rendering metadata with the second wireless earphone.

* * * * *